United States Patent
Chen et al.

(10) Patent No.: US 7,232,895 B1
(45) Date of Patent: Jun. 19, 2007

(54) DISAZO RED REACTIVE DYE COMPOUND CONTAINING QUARTERNARY AMMONIUM GROUP

(75) Inventors: Wen-Jang Chen, Taoyuan Hsien (TW); Chien-Yu Chen, Taoyuan Hsien (TW); Chen-Lung Kao, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/545,420

(22) Filed: Oct. 11, 2006

(30) Foreign Application Priority Data

Apr. 26, 2006 (CN) .................. 2006 1 0078104

(51) Int. Cl.
*C09B 62/513* (2006.01)
(52) U.S. Cl. .................. 534/605; 534/612; 534/614
(58) Field of Classification Search .............. 534/605, 534/612, 614
See application file for complete search history.

(56) References Cited

U.S. PATENT DOCUMENTS 6,537,332 B1 * 3/2003 Tzikas et al. .............. 8/549

FOREIGN PATENT DOCUMENTS

JP 08-60017 * 3/1996

* cited by examiner

*Primary Examiner*—Fiona T. Powers
(74) *Attorney, Agent, or Firm*—Bacon & Thomas, PLLC

(57) ABSTRACT

The present invention relates to a disazo red reactive dyestuff containing quaternary ammonium group of the following formula (1):

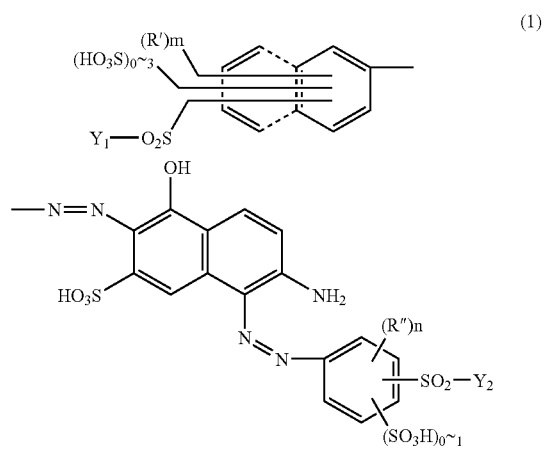

wherein R', R", m, n, $Y_1$ and $Y_2$ are defined the same as in the specification. The disazo red reactive dyestuff of the present invention has a good dye uptake while dyeing cellulose fibers, which satisfies the economical demand of high build up in the market.

17 Claims, No Drawings

DISAZO RED REACTIVE DYE COMPOUND CONTAINING QUARTERNARY AMMONIUM GROUP

BACKGROUND OF THE INVENTION

1. Field of the Invention

The present invention relates to a novel compound, and more particularly, relates to a novel disazo red reactive dye compound containing quaternary ammonium group.

2. Description of the Related Art

Nowadays, the development of reactive dyestuffs goes toward the economical demand of high fixation, good build up and good wash-off so that not only the new reactive dyestuffs, in its properties, contain sufficient substantivity to improve the fixation, but also the unfixed parts of the dyestuffs need good wash-off property.

For a disazo reactive red dyestuff with properties of high color yields and high fixation, the following formula (2) disclosed in Japanese patent application No. JP08060017 has higher fastness due to the disazo reactive dyestuff with high color yields thereof contains Sulphato Ethyl Sulphone (SES).

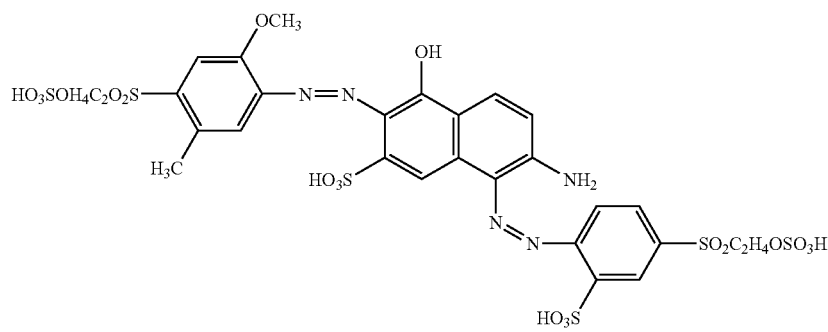

(2)

For the structural characteristics of the dyestuffs, however, the reactive dyestuffs have $SO_3^-$ with negative charge to improve the solubility; on the other hand, the surface of the cellulose fibers forms a layer of negative charge during the bath dyeing. The disadvantage of electrical repulsion between the reactive dyestuffs and the cellulose fibers results in reduction of permeability, absorbability and binding fixation for the dye molecules to the cellulose fibers.

The quaternary ammonium groups have high reactivity and can temporarily improve the substantivity of the dyestuffs, facilitating the affinity (F/E value) between the dye molecules and the cellulose fibers, and thereby increasing the chance for fixation. The unfixed parts of the dye molecules have excellent solubility and good wash off property even after taking off the quaternary ammonium groups by hydrolysis. The quaternary ammonium groups accompanying the selective color base structure make the dyestuffs contain the properties of high color value, high fixation, stable binding between the fibers and the dyestuffs, excellent wet fastness, light fastness and wet fastness.

SUMMARY OF THE INVENTION

The present invention provides a disazo red reactive dye compound containing quaternary ammonium group of the following formula (1):

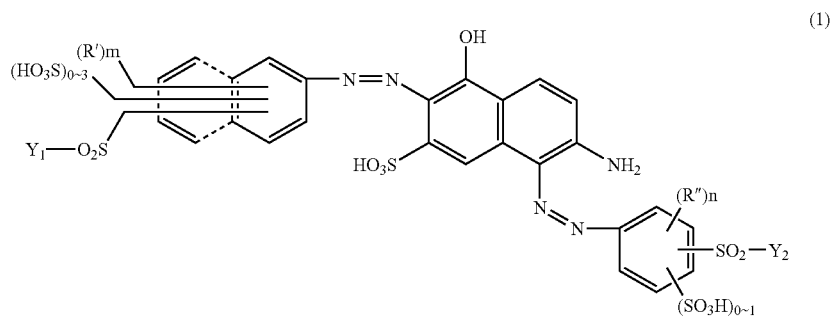

(1)

wherein

R' is hydrogen, $C_1$-$C_4$ alkyl or $C_1$-$C_4$ alkoxyl, m is integer between 0 to 3, and each R' independently is identical or different;

R" is hydrogen, $C_1$-$C_4$ alkyl or $C_1$-$C_4$ alkoxyl, n is integer between 0 to 2, and each R" independently is identical or different;

$Y_1$ and $Y_2$ are each independently of the other —$CH_2CH_2OSO_3H$, —$CH$=$CH_2$ or —$CH_2CH_2$—U, and at least one of the $Y_1$ and $Y_2$ is —$CH_2CH_2$—U; U is a quaternary ammonium group.

The disazo red reactive dye compound containing quaternary ammonium group of formula (1) of the present invention, wherein m is preferable 0 or 2. When m is 2, it is more preferable that one of R' is $C_1$-$C_4$ alkyl, and another is $C_1$-$C_4$ alkoxyl.

The disazo red reactive dye compound containing quaternary ammonium group of formula (1) of the present invention, wherein n is preferable 0 or 1. When n is 1, it is more preferable that R" is $C_1$-$C_4$ alkoxyl.

In the disazo red reactive dye compound containing quaternary ammonium group of formula (1) of the present invention, U is preferably selected from the group consisting of:

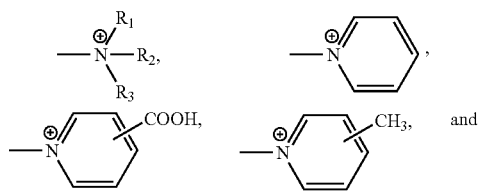

-continued

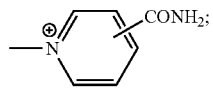

wherein $R_1$, $R_2$, and $R_3$ are each independently of one another $C_1$-$C_4$ alkyl. Preferably, $R_1$, $R_2$, and $R_3$ are all methyl.

More preferably, U is

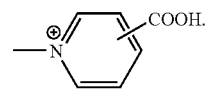

When the reactive dyestuff of formula (1) of the present invention presents in the forms of free acid, the preferable examples of the reactive dyestuffs are as the following formula (3) to formula (11) reactive dye compounds.

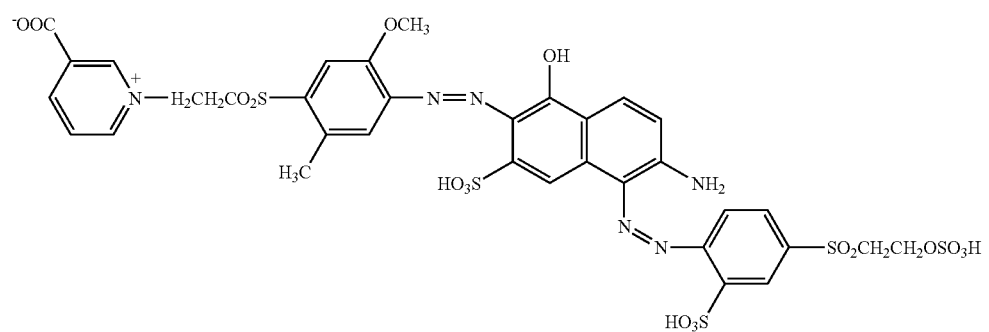

-continued
(5)
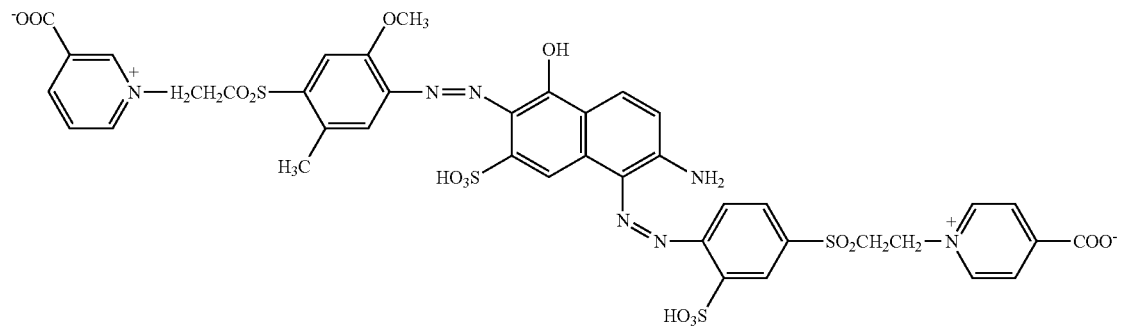
(6)
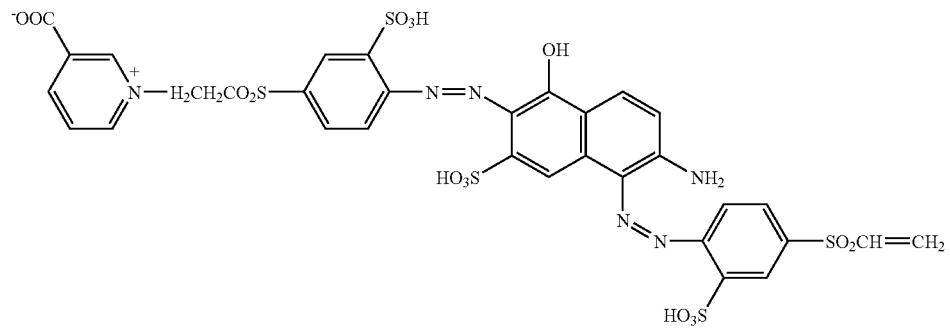
(7)
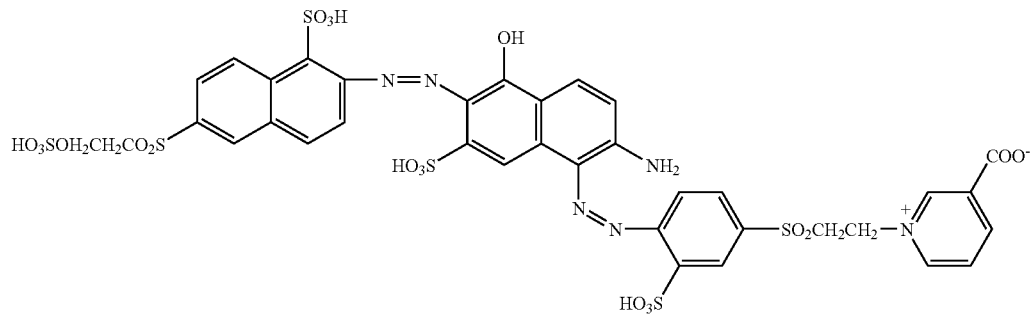
(8)
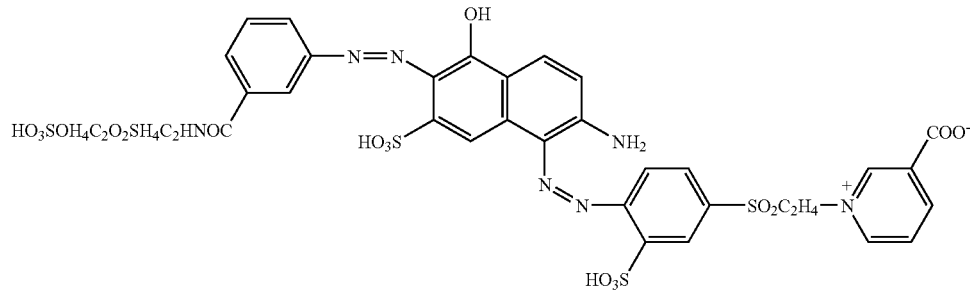
(9)
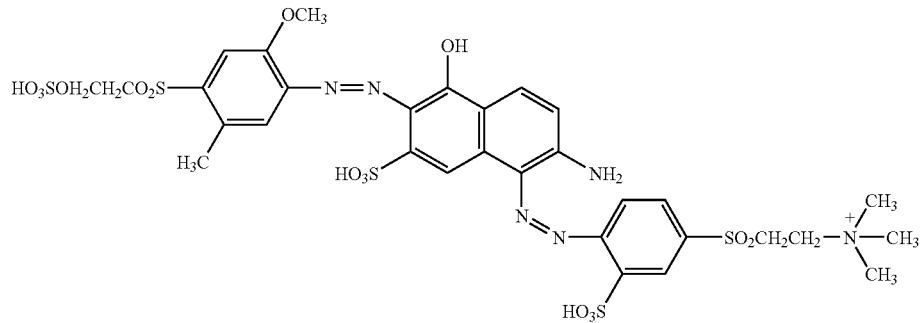

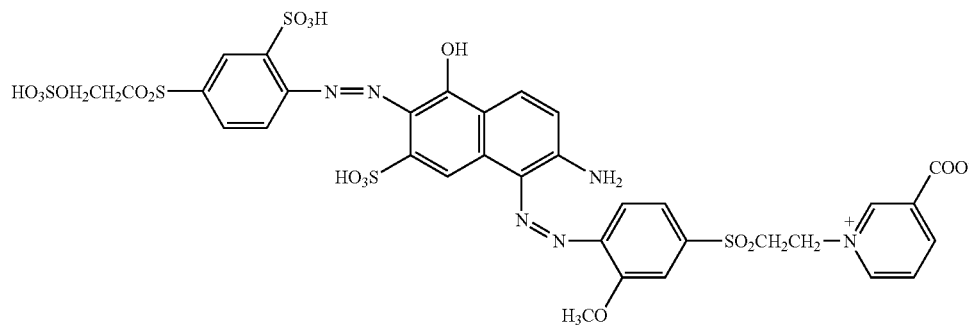
(10)

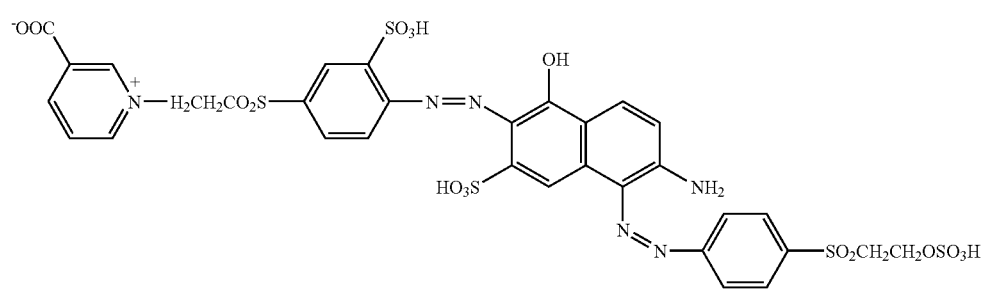
(11)

DETAILED DESCRIPTION OF THE PREFERRED EMBODIMENT

The disazo red reactive dye compound of formula (1) of the present invention can be prepared by reacting the following compounds, M1, M2, and M3 together.

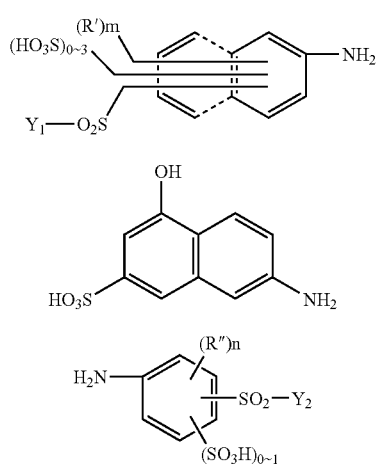

The diazotizing salt compounds of M1 and M3 are synthesized by common method, which is generally proceeded in a nitrite acidic solution at low-temperature. In the coupling reaction between the diazotizing salt compounds and the M2 compound, the first diazotizing salt is generally coupling on the 8-position of the M2 compound while the second diazotizing salt is coupling on the 3-position of the M2 compound. The ideal condition for the coupling reaction is in a condition of pH 2~7 at low temperature, and preferably, is pH 3~5 at a temperature of 5~25° C.

The above reactive dyestuff of formula (1) of the present invention can be presented in the forms of a free acid or a salt, especially the alkaline metal salts and the alkaline earth metal salts. In the applications of dyestuffs, it is preferred to use the reactive dyestuff of formula (1) in the form of alkaline metal salts.

When applying the disazo red reactive dyestuff containing quaternary ammonium group of the present invention to dye or print cellulose fiber materials, the method includes usage of a solution containing the reactive dyestuff of formula (1) to deal with the cellulose fibers. The cellulose fibers suitable for the reactive dyestuff of the present invention are not limited, but it is preferred to be cotton.

For describing conveniently, the reactive dyestuff is expressed as free acid in the specification. To be produced in a great amount, the reactive dyestuff of the present invention can be presented as water-soluble salts, particularly the alkaline metal salts, such as sodium salt, lithium salt, potassium salt or ammonium salt, and preferably sodium salt.

The disazo red reactive dyestuff containing quaternary ammonium group of the present invention can be mixed with each other to form a composition. The above composition can be prepared in several ways. For example, the dye components can be prepared separately and then mixed together. The method for mixing the reactive dyestuffs of the present invention may not be limited. For instance, the mixing can be performed in a suitable mixer, such as a tumbler, or in a suitable mill, such as a ball mill and a sand mill. The mixing methods described herein are all make a dye liquid to mix individual dyes by means of stir. The present invention may control the reactive condition in the preparation of each dye to obtain a desired composition. The present invention may also mix individual dyes in the dyeing or printing process.

The disazo red reactive dyestuff containing quaternary ammonium group of the present invention can be applied to dye and print cellulose fibers. The examples of the suitable fibers can be natural cellulose fibers, such as cotton, linen and hemp, celluloses and regenerated fibers. The reactive dyestuff of the present invention can also be applied to dye and print fiber blended fabrics containing hydroxyl groups, such as rayon, cotton/nylon blending, cotton/polyester blending.

The dyestuff of the present invention can be applied to the fiber material and fixed on the fiber in various ways, in particularly in the form of aqueous dyestuff solutions and printing pastes. They can be applied to cellulose fibers by general dyeing methods, such as exhaustion dyeing, continuous dyeing, cold-pad-batch dyeing or printing.

The quaternary ammonium group of the present invention having high substantivity and penetrability to cellulose fibers shows high reactivity, high fixation yield and good build up in economic benefits. The novel dyestuff containing quaternary ammonium group of formula (1) can be applied under middle temperature dyeing of 50-60° C. In the meantime, the dyestuff containing quaternary ammonium group of formula (1) reduces the amount of alkaline needed in the dyeing process, improves the fixation yield for the dyestuff, and makes the unfixed dye molecules easy to be washed off after hydrolysis. Appropriate quaternary groups, such as a nicotine acid group, are biodegradable after dyeing, which solve the problems of wastewater process and make the dyestuff according to the present invention have an environment-friendly structure. The novel dyestuffs of the present invention has a deep color value and stable binding ability between the fibers and the dyes, which forms the properties of good washing fastness, light fastness and wet fastness.

Hereinafter, the present invention will be further explained. However, it is to be understood that the examples below are only for illustrated, but not to limit the scope of the present invention.

In the examples, the temperature is represented by centigrade degree (° C.) and the parts by weight and parts by volume are represented by gram (g) and milliliter (ml), respectively.

PREPARATION EXAMPLE 1

Taking 36.1 parts of 1-aminobenzene-4-(β-sulfatoethylsulfone)-2-sulfonic acid in 150 parts of 0° C. water. Adding 5 parts of NaOH to the solution and adjusting the pH value thereof to 13. After maintaining the pH value of 13 for 15 minutes, adding HCl solution to the reaction solution until the pH value 5~6. In that time, adding 12.7 parts of nicotine acid into the reaction solution. Then, heating the reaction solution to 60° C. and remain the solution at 60° C. for 1~2 hours before stopping the process of reaction. At last, by means of general used NaCl salt-out, filtration, and salt solution wash procedure to obtain a product with structure of the following formula (R1).

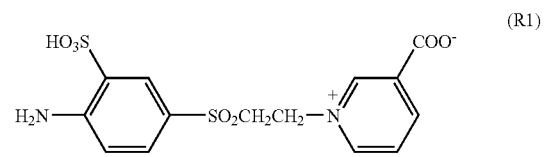

PREPARATION EXAMPLE 2

Dispersing 32.5 parts of (2-methoxyl-4-β-sulfatoethylsulfone-5-methyl)aniline in 150 parts of 0° C. water. Adding 4.5 parts of NaOH to the solution and adjusting the pH value thereof to 13. After maintaining the pH value of 13 for 15 minutes, adding HCl solution to the reaction solution until the pH value 5~6. In that time, adding 12.7 parts of nicotine acid into the reaction solution. Then, heating the reaction solution to 60° C. and remain the solution at 60° C. for 1~2 hours before stopping the process of reaction. At last, by means of general used NaCl salt-out, filtration, and salt solution wash procedure to obtain a product with structure of the following formula (R2).

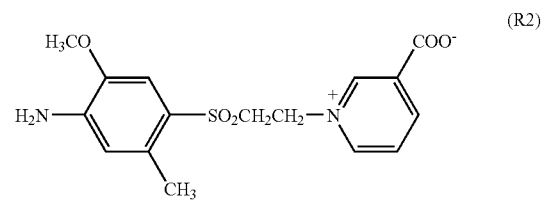

EXAMPLE 1

To 150 parts of 0° C. water, 19.4 parts of compound (R1) obtained from the Preparation Example 1 and 12.6 parts of 32% HCl solution are added. Stirring the solution till the additive dispersed evenly, and then adding 3.7 parts of $NaNO_2$ solution therein rapidly. Controlling the temperature 0~5° C. to proceed with diazotization for about 1 hour. Then, adding 12 parts of 7-amino-4-hydroxy-naphthalene-2-sulfonic acid powder and slowly adjusting the reaction pH to 3.5 with 10 parts of $NaHCO_3$ to complete a coupling reaction. Synthesizing 16.3 parts of 2-methoxy-5-methyl-4-(beta-sulfatoethylsulfonyl)aniline by the same method to obtain a diazotizing salt solution, which is added into the above coupling solution. Adjusting the reaction pH to 5~6 slowly with 5 parts of $Na_2CO_3$. After the reaction, obtaining a red product as the following formula (3) through salting-out, filtrating, and drying:

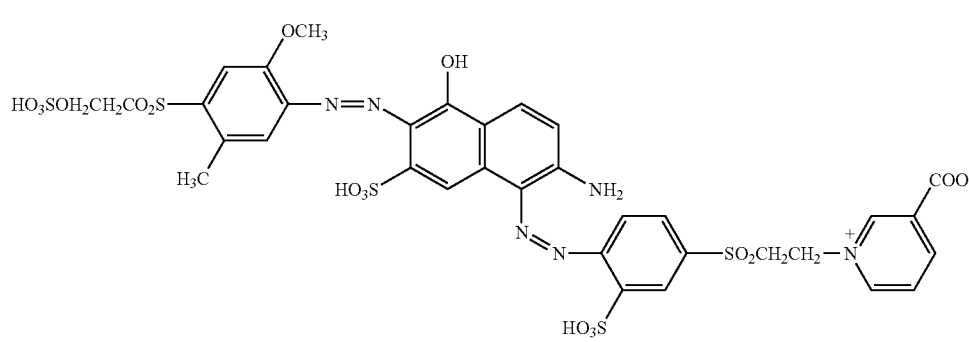

EXAMPLE 2

To 150 parts of 0° C. water, 18.1 parts of 1-aminobenzene-4-(β-sulfatoethylsulfone)-2-sulfonic acid and 12.6 parts of 32% HCl solution are added. Stirring the solution till the additive dispersed evenly, and then adding 3.6 parts of $NaNO_2$ solution therein rapidly. Controlling the temperature 0~5° C. to proceed with diazotization for about 1.5 hours. Then, adding 12 parts of 7-amino-4-hydroxy-Naphthalene-2-sulfonic acid powder and slowly adjusting the reaction pH to 3~6 with 6 parts of $NaHCO_3$ to obtain a reddish orange coupling solution.

Synthesizing 17.5 parts of compound (R2) obtained from Preparation Example 2 by the same method to obtain a diazotizing salt solution, which is added into the above coupling solution. Adjusting the reaction pH to 5~6 slowly with 5 parts of $Na_2CO_3$. After the reaction, obtaining a red product as the following formula (4) through salting-out, filtrating, and drying:

the temperature for 1~2 hours to obtain a product (R3) of following structure and lowing the temperature to 20° C. in reserve.

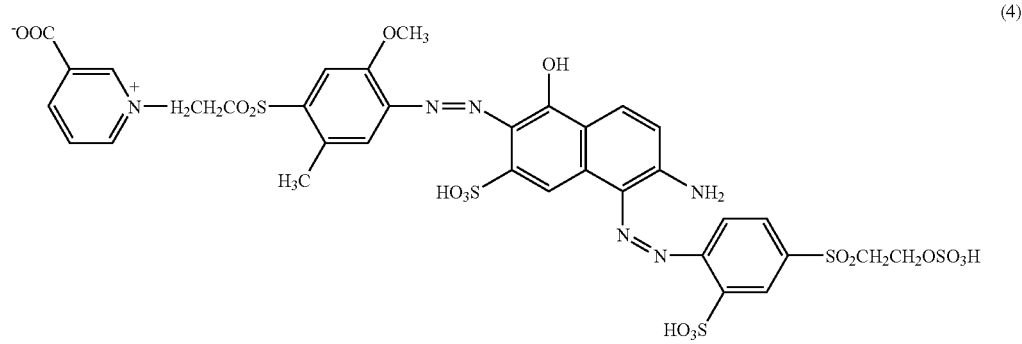

(R3)

(4)

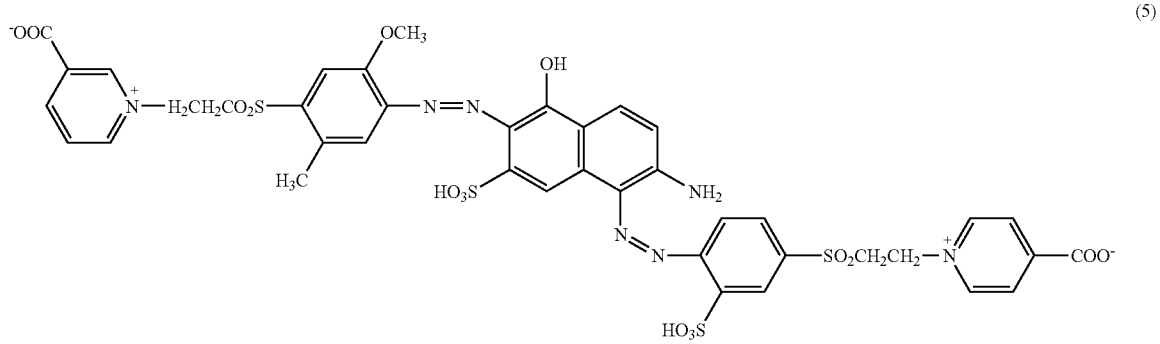

EXAMPLE 3

To 150 parts of 0° C. water, 18.1 parts of 1-aminobenzene-4-(β-sulfatoethylsulfone)-2-sulfonic acid and 12.6 parts of 32% HCl solution are added. Stirring the solution till the additive dispersed evenly, and then adding 3.6 parts of $NaNO_2$ solution therein rapidly. Controlling the temperature 0~5° C. to proceed with diazotization for about 1.5 hours.

In accordance with the diazotization process as usually used, adding the diazotizing salt solution containing 17.5 parts of compound (R2) obtained from Preparation Example 2 into the above coupling solution. Adjusting the reaction pH to 5~6 slowly with 5 parts of $Na_2CO_3$. After the reaction, obtaining a red product as the following formula (5) through salting-out, filtrating and drying:

(5)

Then, adding 12 parts of 7-amino-4-hydroxy-Naphthalene-2-sulfonic acid powder and slowly adjusting the reaction pH to 3 with 10 parts of $NaHCO_3$ to complete a coupling reaction. Lowing the temperature to 0° C., adjusting the pH to 13 with 10 parts of 45% NaOH solution, maintaining the same pH value for 15 minutes, and then adjusting the pH to 5~6 with HCl solution. Adding 6.4 parts of isonicotine acid therein, heating the reaction solution to 60° C., maintaining

EXAMPLES 4~9

The reactive dyestuffs that can be synthesized with the synthesizing methods of Example 1~3 are shown as below, which present excellent fastness while applying to cotton fiber dyeing.

| Example | The Structure of the Product | Color |
|---|---|---|
| 4 | 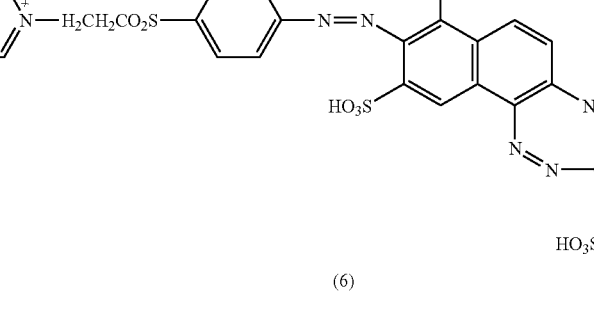<br>(6) | Yellowish Red |
| 5 | 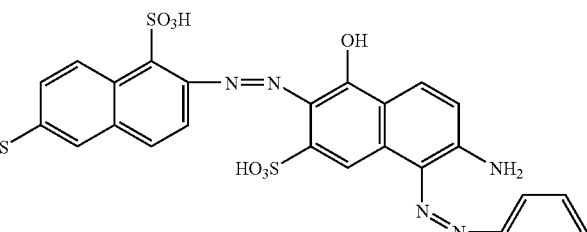<br>(7) | Red |
| 6 | 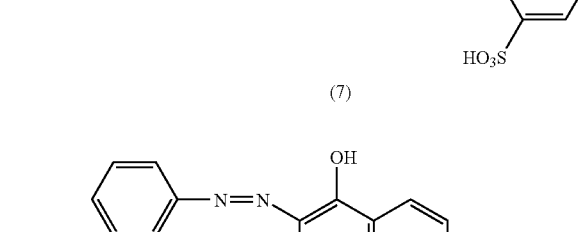<br>(8) | Red |
| 7 | 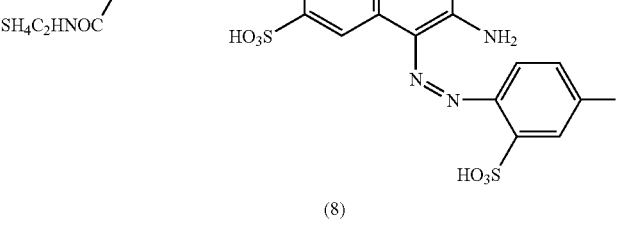<br>(9) | Red |

-continued

| Example | The Structure of the Product | Color |
|---|---|---|
| 8 | 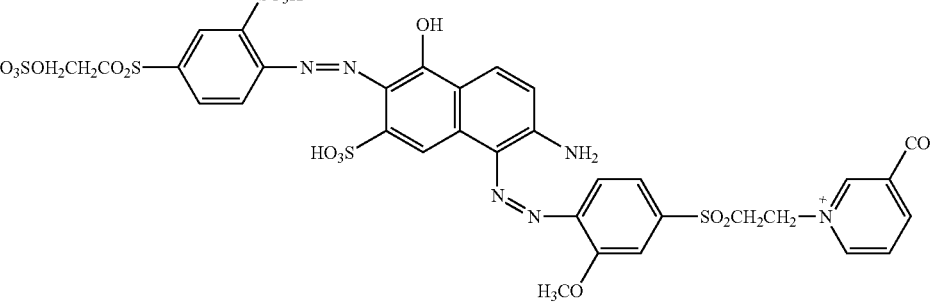 (10) | Yellowish Red |
| 9 | 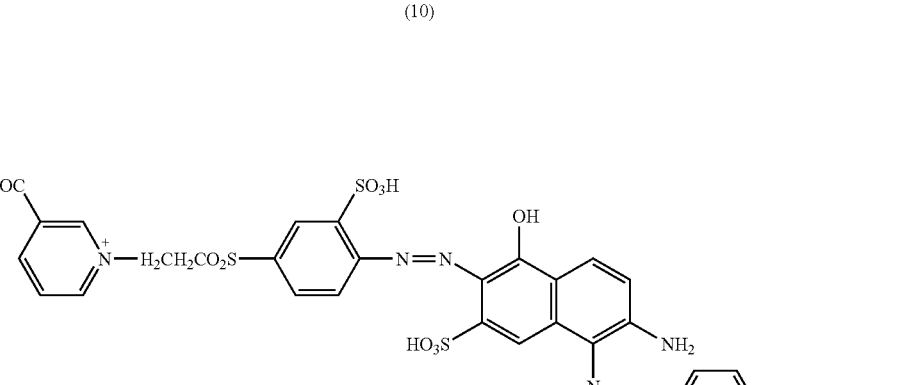 (11) | Orange |

Test of Build Up

Testing the build up properties of formula (2) dyestuff produced by Everlight Chemical Industrial Corporation and formula (3) dyestuff obtained from Example 1 according to the present invention with different exhaust dyeing conditions. The conditions and the results thereof are shown below: dissolving 1 part of the above dyestuffs, formula (2) dyestuff and formula (3) dyestuff, in 1000 parts of water; adding pure Glauber's Salt with amounts as the following table shown and 100 parts of un-mercerized cotton cloths to the solution; maintaining the dyeing temperature of the solution as shown in the following table and stirring the solution for 60 minutes; then adding 20 parts of pure alkali, keeping the temperature of 60° C. to proceed with dyeing for 1 hour; after the dyeing process, water-cleaning, soaping off and drying the cloths to obtain a dyed fabric. Testing the appearance and strength comparative value of the dyed fabric with Datacolor SF-600 PLUS computer testing system.

Testing the build up properties of formula (2) dyestuff and formula (3) dyestuff with different exhaust dyeing conditions. The conditions and the results thereof are shown below:

|  | Temperature for dyeing | Amount of Glauber's Salt | Appearance and Strength Comparative Value (Formula (3)–Formula (2)) |
|---|---|---|---|
| Test 1 | 60° C. | 60 parts | +4.82% |
| Test 2 | 50° C. | 60 parts | +4.88% |
| Test 3 | 60° C. | 20 parts | +4.12% |
| Test 4 | 60° C. | 40 parts | +4.32% |

From the testing results of the above table, the novel disazo reactive dyestuff containing quaternary groups according to the present invention shows not only high affinity and direct properties but also good tinctorial yield while dyeing the cellulose fibers.

From the foregoing description, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A disazo red reactive dyestuff containing quaternary ammonium group of the following formula (1):

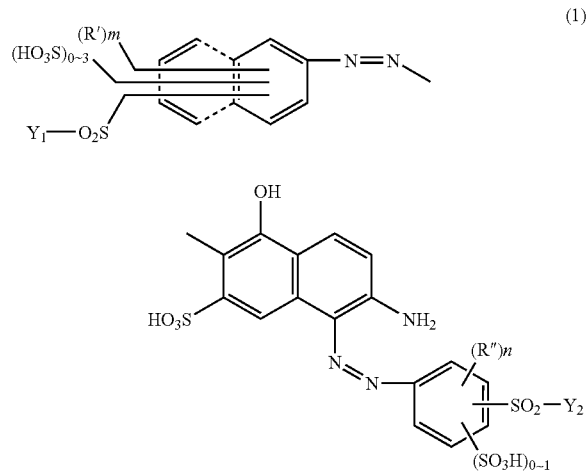

wherein
R' is hydrogen, $C_1$-$C_4$ alkyl or $C_1$-$C_4$ alkoxyl, m is integer between 0 to 3, and each R' independently is identical or different;
R" is hydrogen, $C_1$-$C_4$ alkyl or $C_1$-$C_4$ alkoxyl, n is integer between 0 to 2, and each R" independently is identical or different;
$Y_1$ and $Y_2$ are each independently of the other —$CH_2CH_2OSO_3H$, —$CH=CH_2$ or —$CH_2CH_2$—U, and at least one of the $Y_1$ and $Y_2$ is —$CH_2CH_2$—U; U is a quaternary ammonium group.

2. The disazo red reactive dyestuff of claim 1, wherein m is 2, one of the R' is $C_1$-$C_4$ alkyl, and the other is $C_1$-$C_4$ alkoxyl.

3. The disazo red reactive dyestuff of claim 1, wherein m is 0.

4. The disazo red reactive dyestuff of claim 1, wherein n is 1, and R" is $C_1$-$C_4$ alkoxyl.

5. The disazo red reactive dyestuff of claim 1, wherein n is 0.

6. The disazo red reactive dyestuff of claim 1, wherein U is a quaternary ammonium group selected from the group consisting of:

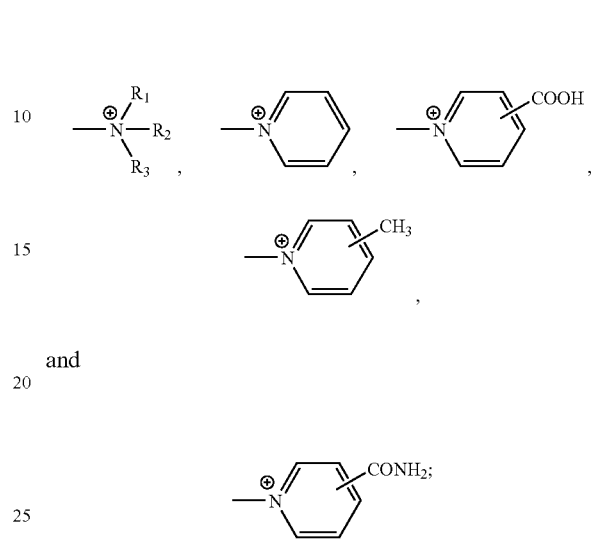

wherein $R_1$, $R_2$, and $R_3$ are each independently of one another $C_1$-$C_4$ alkyl.

7. The disazo red reactive dyestuff of claim 6, wherein U is

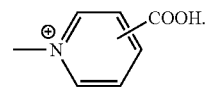

8. The disazo red reactive dyestuff of claim 6, wherein said $R_1$, $R_2$, and $R_3$ are all methyl.

9. The disazo red reactive dyestuff of claim 1, wherein said reactive dyestuff of formula (1) is the following formula (3):

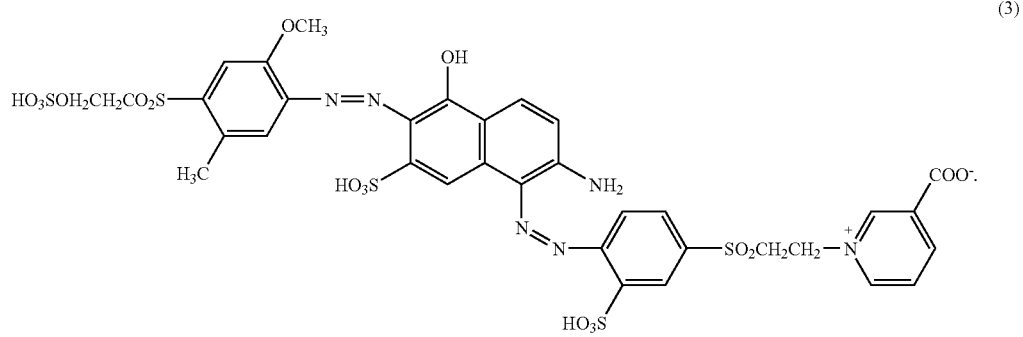

10. The disazo red reactive dyestuff of claim 1, wherein said reactive dyestuff of formula (1) is the following formula (4):
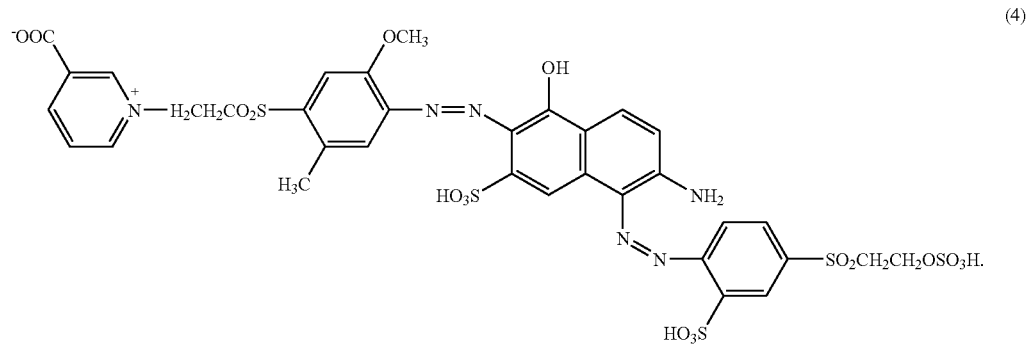
(4)
11. The disazo red reactive dyestuff of claim 1, wherein said reactive dyestuff of formula (1) is the following formula (5):
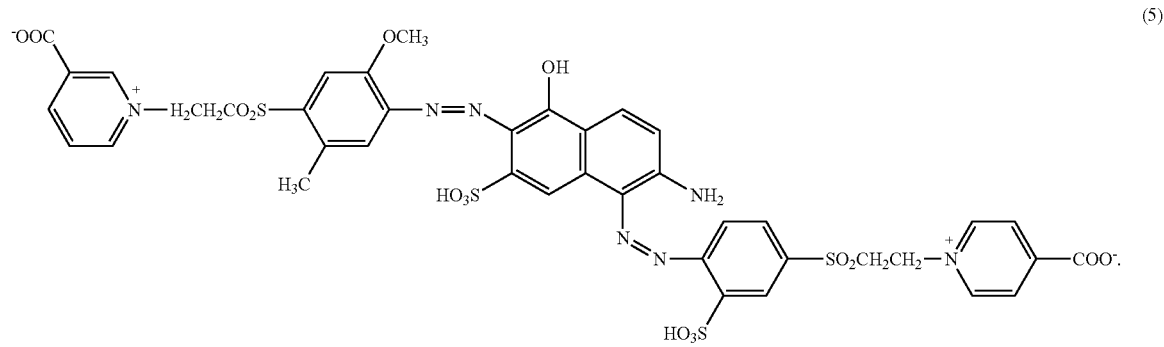
(5)
12. The disazo red reactive dyestuff of claim 1, wherein said reactive dyestuff of formula (1) is the following formula (6):
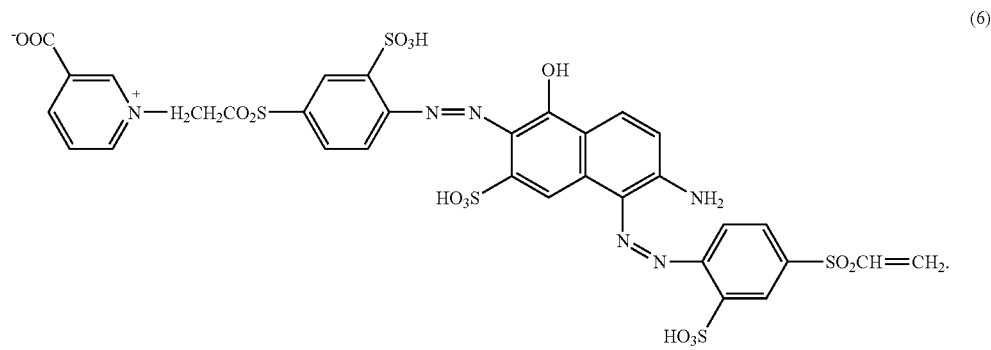
(6)

13. The disazo red reactive dyestuff of claim 1, wherein said reactive dyestuff of formula (1) is the following formula (7):
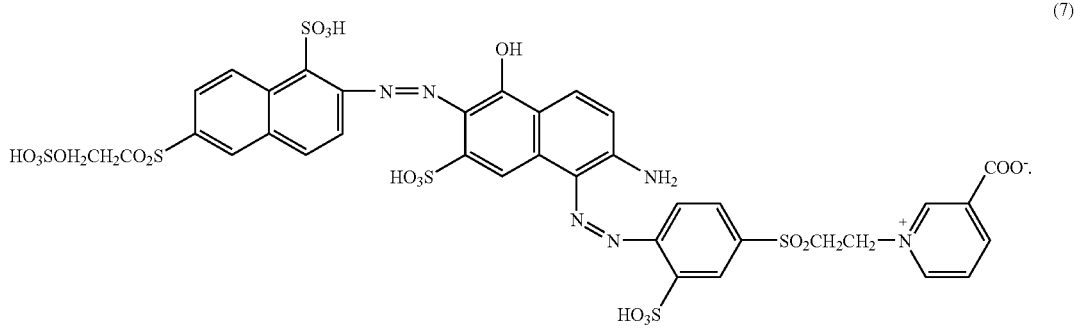
(7)
14. The disazo red reactive dyestuff of claim 1, wherein said reactive dyestuff of formula (1) is the following formula (8):
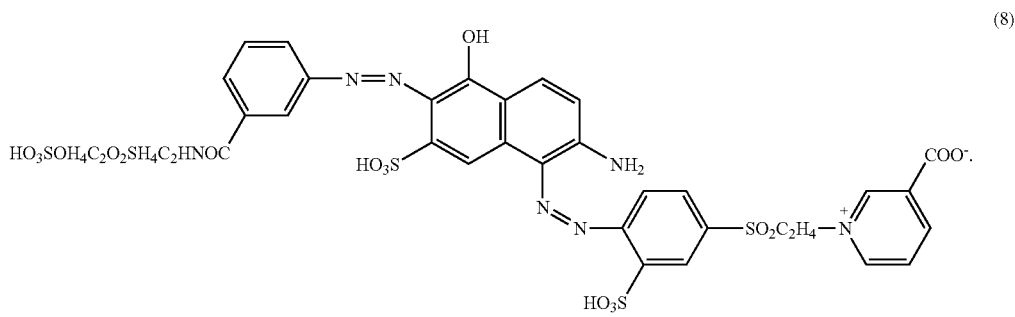
(8)
15. The disazo red reactive dyestuff of claim 1, wherein said reactive dyestuff of formula (1) is the following formula (9):
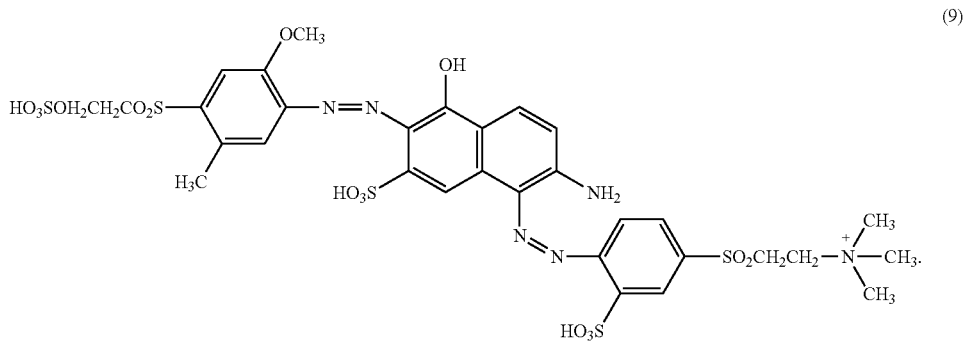
(9)

16. The disazo red reactive dyestuff of claim 1, wherein said reactive dyestuff of formula (1) is the following formula (10):
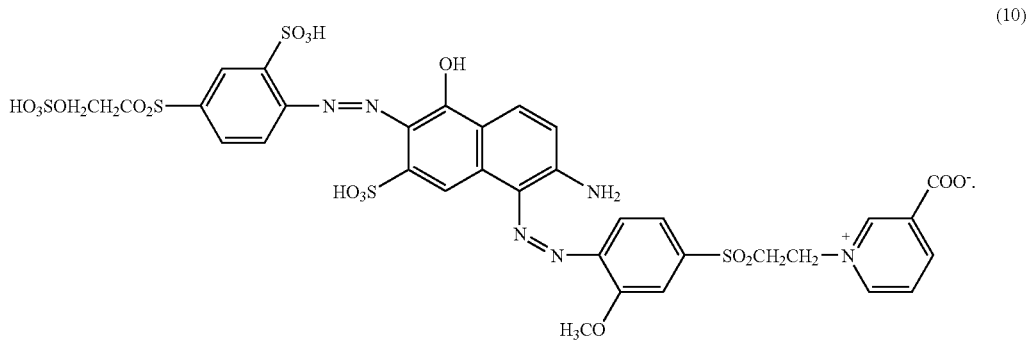
(10)
17. The disazo red reactive dyestuff of claim 1, wherein said reactive dyestuff of formula (1) is the following formula (11):
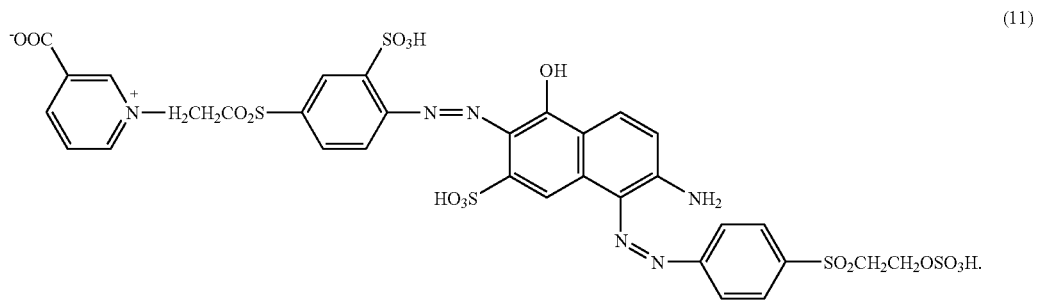
(11)
* * * * *